United States Patent
Alcouffe (10) Patent No.: US 7,203,244 B2
(45) Date of Patent: Apr. 10, 2007

(54) COFDM DEMODULATOR WITH AN OPTIMAL FFT ANALYSIS WINDOW POSITIONING

(75) Inventor: Nicole Alcouffe, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 701 days.

(21) Appl. No.: 10/349,561

(22) Filed: Jan. 22, 2003

(65) Prior Publication Data

US 2003/0138060 A1    Jul. 24, 2003

(30) Foreign Application Priority Data

Jan. 22, 2002   (FR)   ................................. 02 00768

(51) Int. Cl.
*H04K 1/10*     (2006.01)
*H04L 27/16*    (2006.01)

(52) U.S. Cl. ........................................ 375/260; 375/326

(58) Field of Classification Search ............... 375/260, 375/340, 354, 355, 316, 326; 370/208, 210
See application file for complete search history.

(56) References Cited

U.S. PATENT DOCUMENTS

| 6,330,293 | B1  |   | 12/2001 | Klank et al. ................. 375/344 |
| 6,449,245 | B1  | * | 9/2002  | Ikeda et al. .................. 370/208 |
| 6,650,617 | B1  | * | 11/2003 | Belotserkovsky et al. .. 370/210 |
| 6,993,083 | B1  | * | 1/2006  | Shirakata et al. ........... 375/260 |
| 2004/0105512 | A1 | * | 6/2004  | Priotti ......................... 375/340 |

FOREIGN PATENT DOCUMENTS

EP    0 895 388 A2    2/1999
WO    WO 01/69878 A1    9/2001

* cited by examiner

*Primary Examiner*—Don N. Vo
(74) *Attorney, Agent, or Firm*—Lisa K. Jorgenson; Dennis M. de Guzman; Seed IP Law Group PLLC (57) ABSTRACT

A COFDM demodulator or analogue comprising a fast Fourier transform circuit analyzing a received signal in a window corresponding to a symbol, each symbol conveying several phase- and/or amplitude-modulated carriers, some of which are signaling carriers, and a circuit for positioning said window. The circuit for positioning said window uses the non demodulated signaling carriers.

20 Claims, 4 Drawing Sheets

COFDM DEMODULATOR WITH AN OPTIMAL FFT ANALYSIS WINDOW POSITIONING

BACKGROUND OF THE INVENTION

1. Field of the Invention

The present invention relates to a so-called COFDM ("Coded Orthogonal Frequency Multiplex") demodulator or analogue.

2. Discussion of the Related Art

Figure 1:
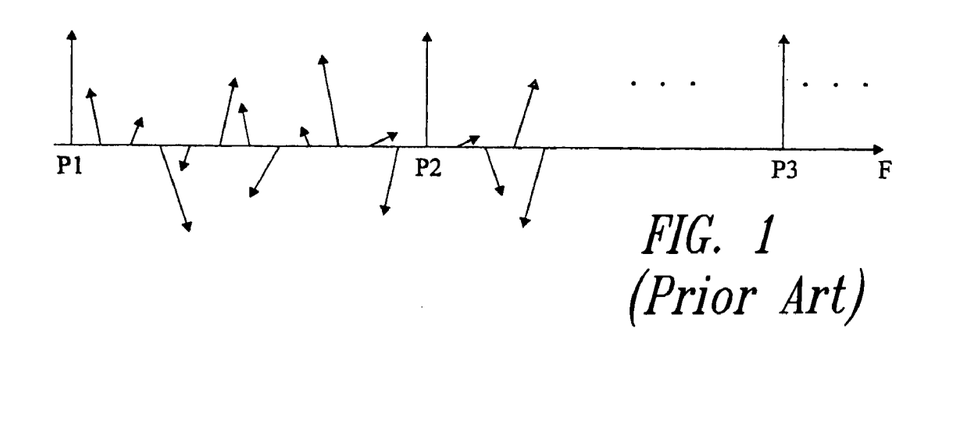
FIG. 1, previously described, shows phase- and amplitude-modulated carriers in a COFDM transmission system.

FIG. 1 is intended to illustrate the principle of a COFDM modulation. Data packets to be transmitted are put in the form of N complex coefficients associated with N respective frequencies (or carriers). Number N of the frequencies is equal, for example, to 1705 for the so-called "2K" mode and to 6817 for the so-called "8K" mode, in digital television hertzian transmission. Each complex coefficient corresponds to a vector which is illustrated in FIG. 1 as starting from a frequency axis at a point indicating the frequency associated with the coefficient.

These N coefficients are processed by inverse fast Fourier transform (IFFT), which generates a "symbol" formed of a sum of modulated carriers, each carrier having an amplitude and a phase determined by the associated complex coefficient. The symbol thus generated is transmitted.

Conventionally, in hertzian transmission, the width of the transmission channel is of 6, 7, or 8 MHz and each carrier is separated from the next one by a frequency interval $\Delta f=1/Tu$. Tu is the duration of transmission of a symbol and is called the useful duration. The useful duration is on the order of 224 μs in mode 2K and of 896 μs in mode 8K, for a bandwidth of 8 MHz.

Upon reception, a receiver submits the symbol to the inverse processing, that is, mainly a fast Fourier transform (FFT) to restore the original complex coefficients.

As shown in FIG. 1, some regularly distributed vectors P1, P2, P3 have a known constant value. These vectors, or the corresponding carriers, are called pilots. They are used to reflect the distortions undergone by the transmitted signal and, by the information that they provide on the channel response, they enable correcting the unknown vectors located between the pilots.

Figure 2:
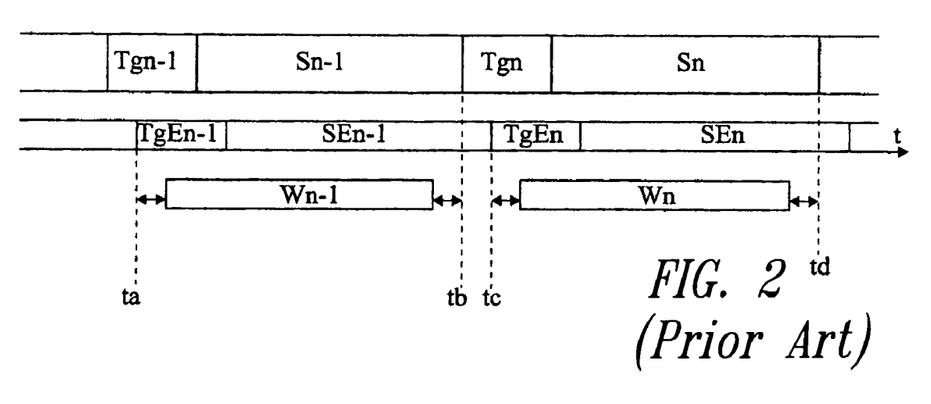
FIG. 2, previously described, shows signals received by a COFDM demodulator and windows of FFT analysis of the signals.

FIG. 2 illustrates a transmission of several successive symbols Sn-1, Sn . . . As show, each of these symbols is preceded by a guard interval Tgn-1, Tgn, which is a copy of part of the end of the corresponding symbol. The guard intervals are often defined by a fraction of useful duration Tu. Conventional values of the guard interval are Tu/32, Tu/16, Tu/8, or Tu/4.

The guard intervals are used to avoid inter-symbol modulation distortions caused by an echo of the transmission. FIG. 2 also shows an echo SEn-1, TgEn-1 . . . of the transmitted signal. This echo is delayed with respect to the main signal by a duration smaller than that of a guard interval Tg.

Each symbol S is normally analyzed by the FFT circuit of the receiver in a window W of same length as the symbol. If there was no guard interval, an analysis window W coinciding with a symbol of the main signal would be astride two symbols of the echo signal. This would cause an error difficult to correct in the FFT calculation.

Guard interval Tg, provided that it is greater than the echo delay or advance, provides a margin for the setting of analysis window W so that it only coincides with portions belonging to the same symbol, in the main signal as well as in the echo. The fact for an analysis window to be astride a symbol and its guard interval introduces a phase shift which is corrected by means of the above-mentioned pilots.

In FIG. 2, symbol Sn-1 must be analyzed in a window Wn-1 that can extend from time ta, corresponding to the beginning of the guard interval of echo TgEn-1, to time tb corresponding to the end of symbol Sn-1. Similarly, symbol Sn must be analyzed in a window Wn that can extend from time tc, corresponding to the beginning of the guard interval of echo TgEn, to time td corresponding to the end of symbol Sn.

The positioning of analysis windows W is conventionally performed by means of pilots contained in the symbols.

Figure 3:
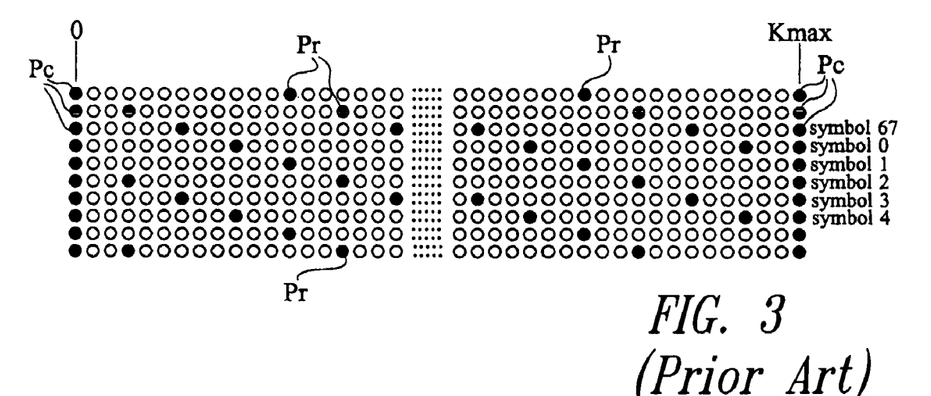
FIG. 3, previously described, schematically shows the position of pilots in symbols.

FIG. 3 schematically shows the place of pilots in the symbols. The symbols are gathered in frames of 68 symbols, conventional in digital television hertzian transmission (standard ETSI EN 300 744, V1.4.1).

In FIG. 3, each line shows a symbol and each square represents the position of a carrier. The carriers are defined as going from a position 0 to a position Kmax, Kmax being equal to 1,704 in mode 2K and to 6,816 in mode 8K. Indeed, only a portion of the possible frequencies is used, especially due to risks of losses at the channel borders. There are two types of pilots.

On the one hand, there are, in each symbol, continuous pilots Pc. The continuous pilots correspond to specific frequencies distributed in the channel. In above-mentioned standard ETSI, there are 45 pilots in mode 2K and 177 pilots in mode 8K. The continuous pilots are present in all symbols and always occupy the same frequency position. In FIG. 3, only the continuous pilots corresponding to positions 0 and Kmax have been shown.

On the other hand, there are, in each symbol, so-called "scattered" pilots Pr, which are arranged every 12 carriers, and shifted by three positions between two successive symbols. Thus, every four symbols, the same arrangement of scattered pilots Pr is found.

The continuous and scattered pilots, of constant amplitude upon transmission, are used to know the pulse response of the channel and, accordingly, in most known circuits, finely position analysis window W.

For this purpose, at the receiver, the complex received time signal, after having been put in baseband, is provided to a fast Fourier transform unit providing the symbol in the frequency field. The pilots are sampled from this symbol. The sampled pilots enable frequency estimation of the channel which, after having undergone an inverse Fourier transform, provides the channel pulse response. The channel pulse response is used to finely position the window.

A problem exists due to the fact that the pilots only provide an incomplete description of the channel. Indeed, taking into account several successive symbols (at least four) only enables having an image of the channel every three points. As a result, the estimation of the pulse response of the channel obtained from the pilots exhibits a periodization of a period equal to useful duration Tu divided by three. Accordingly, if guard interval Tg is relatively large as compared to the useful duration, it is no longer possible to optimally position the window. Such is the case when Tg is equal to Tu/4. An intersymbol modulation, often accompanied by a data loss, may then occur.

A solution to this problem is to analyze the data received after complete decoding and to determine their bit error rate BER. The window location is then modified by trial and error until the bit error rate is acceptable. A problem of this way of proceeding is its inaccuracy and its slowness. Indeed, the complete decoding of the data must be awaited, which may be very long. Generally, with the above solution, a data loss almost inevitably occurs.

SUMMARY OF THE INVENTION

An object of the present invention is to provide a COFDM demodulator or analogue with an optimal positioning of the FFT analysis window.

Another object of the present invention is to provide a COFDM demodulator or analogue with a fast repositioning of the FFT analysis window.

To achieve these objects, the present invention provides a demodulator comprising:

a fast Fourier transform circuit analyzing a received signal in a window corresponding to a symbol, each symbol conveying several phase- and/or amplitude-modulated carriers, some of which are signaling carriers, and a circuit for positioning said window.

The circuit for positioning said window is able to use the non demodulated signaling carriers.

According to an embodiment of the present invention, the circuit for positioning said window comprises a unit for processing the signaling carriers and a window setting unit coupled to the processing unit.

According to an embodiment of the present invention, the processing unit is able to determine a quality criterion from the signaling carriers.

According to an embodiment of the present invention, the demodulator includes one or more first correction units coupled to the fast Fourier transform circuit, and controlled using said quality criterion.

According to an embodiment of the present invention, the circuit for positioning said window comprises at least one test circuit including one or more second correction units having the same function as the first correction unit or units, and coupled to the processing circuit, itself coupled to the window setting unit and able to control the second correction unit or units according to an embodiment of the present invention, the processing unit comprises:

a unit for extracting the signaling carriers from a received symbol, a subtractor for subtracting, to the numbers representative of the extracted signaling carriers, numbers representative of a sequence of signaling carriers transmitted in the symbol, a first calculation unit for providing an amplitude associated with the difference provided by said subtractor, a first adder for providing, for each symbol, the sum of the amplitudes provided by said first calculation means, an adder for adding to the numbers representative of the extracted signaling carriers, numbers representative of a sequence of signaling carriers transmitted in the symbol, and a second calculation unit for providing an amplitude associated with the sum provided by said adder, and a second adder for providing, for each symbol, the sum of the amplitudes provided by said second calculation means.

According to an embodiment of the present invention, the processing unit comprises a third calculation unit coupled to the first and second adders for providing said quality criterion, said quality criterion being a number representative of the smallest sum among the sums provided by the first and second adders.

According to an embodiment of the present invention, the processing unit comprises a first dipping unit coupled to the first adder and to the third calculation unit and a second dipping unit coupled to the second adder and to the third calculation unit.

According to an embodiment of the present invention, the processing unit comprises:

a unit for providing N consecutive "1s", N corresponding to the number of carriers present in a symbol, a unit for modifying the "1s" provided by the unit for providing the "1s", for replacing each "1" corresponding to the position of a signaling carrier in the symbol with a number representative of the signaling carrier, the first signaling carrier corresponding to a "1", and a unit for extracting numbers corresponding to the location of the signaling carriers in the symbol, to provide numbers representative of a sequence of signaling carriers transmitted in the symbol.

The present invention also provides a demodulation method comprising:

a step of transformation by fast Fourier transform analyzing a received signal in a window corresponding to a symbol, each symbol conveying several phase and/or amplitude modulated carriers, some of which are signaling carriers, and a step of positioning of said window.

The step of positioning said window is able to use the non demodulated signaling carriers.

According to an embodiment of the present invention, the positioning step comprises a step of elaboration of a quality criterion by means of which the window is positioned.

According to an embodiment of the present invention, the quality criterion is elaborated based on the signaling carriers of the symbol and corresponds to a measurement of the errors of the received signaling carriers.

The foregoing objects, features and advantages of the present invention, will be discussed in detail in the following non-limiting description of specific embodiments in connection with the accompanying drawings.

DETAILED DESCRIPTION

To efficiently position the analysis window in an optimal way, the present invention uses the signaling carriers, called "TPS carriers", present in the transmitted signal.

The TPS ("Transmission Parameter Signaling") carriers are specific carriers distributed in the available frequency spectrum. The TPS carriers contain coding or decoding information. For example, they indicate the modulation type of the carriers, such as "QPSK", 64 QAM, 16 QAM, etc, the mode, 2K or 8K, the value of the guard interval, the frame number, etc. The TPS carriers always occupy the same place in the symbols. In each symbol, the TPS carriers are all identical before coding. For the transmission, the TPS carriers are coded with a conventional coding of DBPSK type, to have a substantially constant transmission power.

In the previously discussed standard, there are 17 TPS carriers in mode 2K, and 68 in mode 8K. The TPS carriers take up, in the frequency spectrum, locations between those of the continuous pilots and of the scattered pilots. The use, according to the present invention, of the TPS carriers to set the window positioning, will enable refining this positioning and making it optimal.

Figure 4:
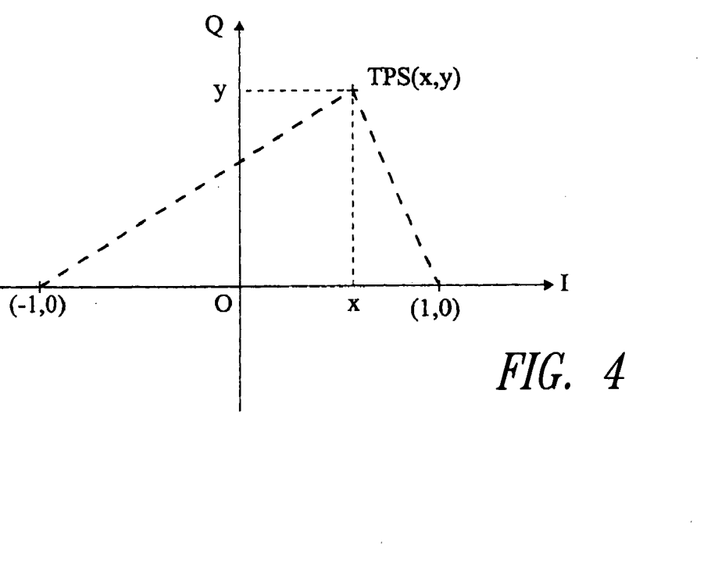
FIG. 4 shows a received carrier of TPS type.

Due to their coding, the TPS carriers can only take two values, and correspond either to complex number (1,0), that is, to real number "1", or to complex number (−1,0), that is, to real number "−1". Since the TPS carriers of a same symbol are all identical before coding, if the first TPS carrier of a symbol corresponds to (1,0), the values of the other TPS carriers of the symbol are determined. The same occurs when the first TPS carrier of the symbol corresponds to (−1,0). Due to the transmission, the received TPS carriers correspond to a complex number (x,y) or x+iy in a plane I,Q, I representing the elements in phase and Q the elements in quadrature of the carrier, as illustrated in FIG. 4.

According to the present invention, a decoding of the TPS carriers and a measurement of the noise thereon enables defining a quality criterion EPQ of the window and, more generally, of the demodulation. Quality criterion EPQ is used in particular to shift the window, if need be, to optimize its positioning. It should be noted that the computation of quality criterion EPQ does not use demodulated values of TPS carriers.

Figure 5:
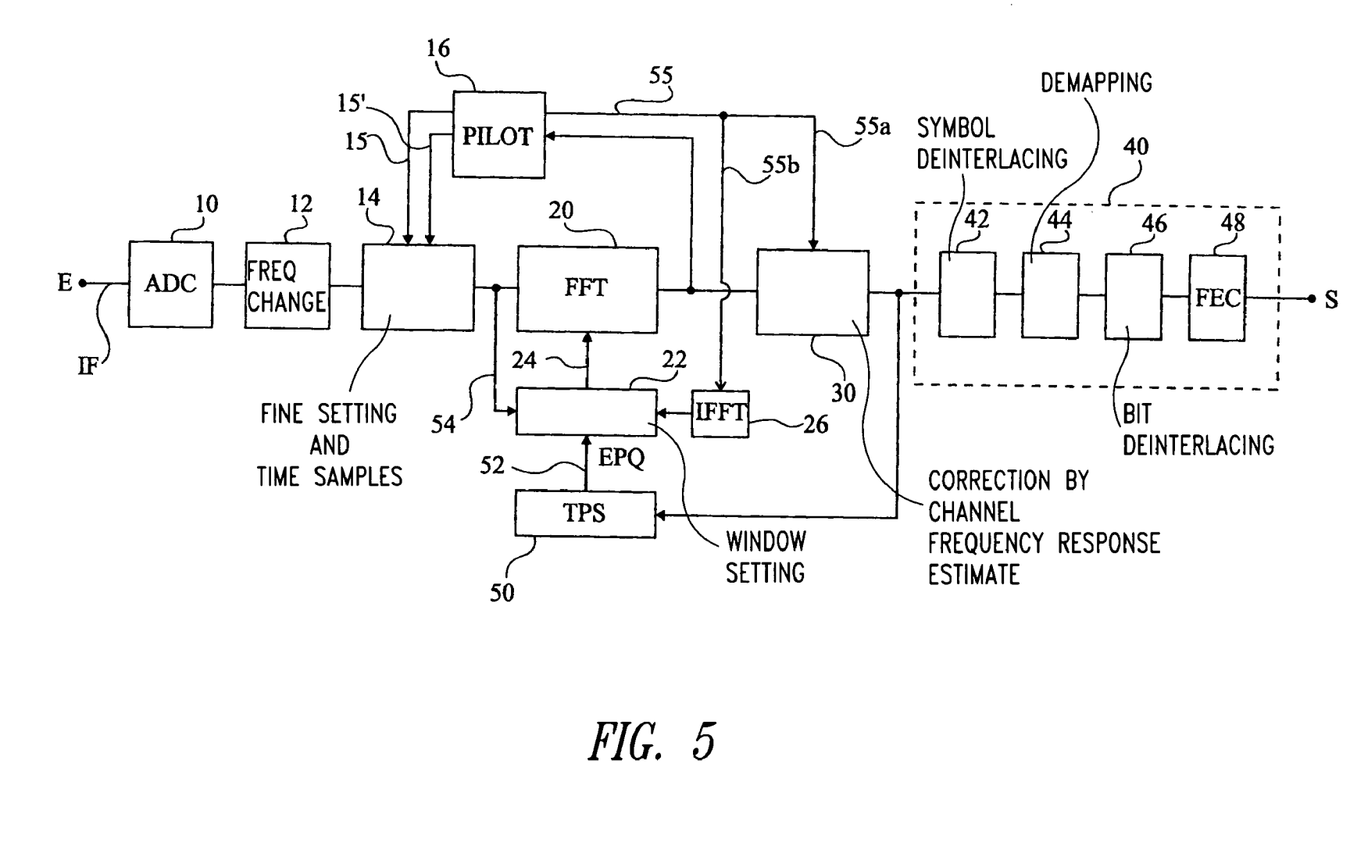
FIG. 5 shows a demodulator according to the present invention.

FIG. 5 shows an example of a demodulator according to the present invention. The received signal comprises continuous pilots, scattered pilots, TPS carriers, and data carriers.

In FIG. 5, an input E of the demodulator receives a signal IF of intermediary frequency enabling sampling, for example 36 MHz. Signal IF corresponds to the signal received after various frequency changes or transpositions.

Input E is coupled to an analog-to-digital converter 10 (ADC) which digitizes input signal IF. Analog-to-digital converter 10 drives a frequency change unit 12. Unit 12 provides a signal substantially in baseband, the spectrum of the signal at the output of unit 12 being centered on a frequency substantially equal to zero. Unit 12 is coupled to a unit 14 enabling on the one hand a fine setting of the central frequency of the signal spectrum and, on the other hand, providing time samples at times appropriate for the subsequent processing. At the output of unit 14, the signal spectrum is centered on a frequency equal to 0 and the number and the time position of the samples are adapted to the transformation by Fourier transform which occurs in the next unit. Unit 14 is controlled by links 15 and 15' connecting unit 14 to a unit 16 for processing the continuous and scattered pilots.

The output of unit 14 drives a fast Fourier transform (FFT) unit 20 which provides the frequencies corresponding to a symbol. Unit 20 is driven by a unit 22 which provides, via a link 24, a signal for setting the analysis window of the Fourier transform.

The output of unit 20 is coupled to unit 16 which extracts and processes the continuous and scattered pilots. Unit 16 provides on links 15 and 15' the signals intended to correct the central frequency of the spectrum and the signal sampling frequency.

The output of unit 20 drives a unit 30 in which the signal is corrected by means of an estimate of the channel frequency response. The estimate of the channel frequency response is performed in unit 16 by means of the pilots. This estimate is provided by unit 16 on a connection 55, a branch 55a of which is coupled to unit 30. At the output of unit 30, the signal comprises the non demodulated TPS carriers and the carriers conveying the data, also non demodulated (by demodulation is meant extracting the information conveyed by these carriers).

The estimate of the channel frequency response, provided by unit 16, supplies, via connection 55 and a branch 55b of connection 55, an inverse fast Fourier transform (IFFT) unit 26, for determining the pulse response of the channel. Unit 26 provides the pulse response of the channel to unit 22, to dynamically adjust the positioning of the FFT analysis window.

The processing of the carriers conveying the data is ensured in a data processing and provision circuit 40. Circuit 40 has a conventional structure and may comprise, as shown in FIG. 4, a symbol deinterlacing unit 42, a so-called "demapping" unit 44, a bit deinterlacing unit 46, and a forward error correction (FEC) unit 48. The output of unit 48 forms output S of circuit 40 and of the demodulator and provides data corresponding to the transmitted data.

Figure 6:
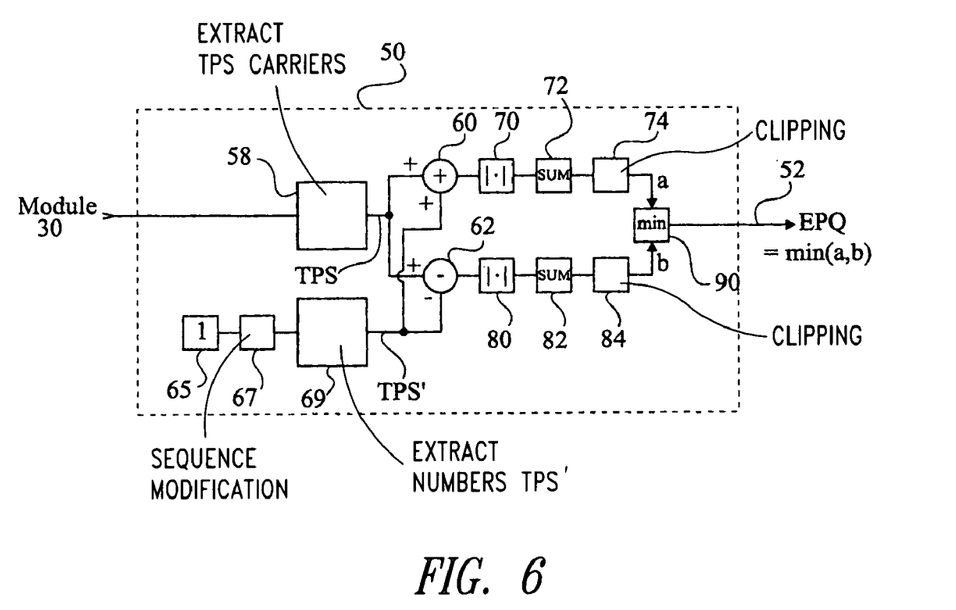
FIG. 6 shows a portion of a demodulator according to the present invention.

The output of unit 30 also drives a unit 50 for processing the TPS carriers. Unit 50, an example of embodiment of which will be described in relation with FIG. 6, provides a quality criterion EPQ on a connection 52. The quality criterion drives, directly or not, unit 22 intended to adjust the setting of the analysis window. Further, unit 22 receives the output signal of unit 14 over a connection 54, to roughly adjust the analysis window.

A known example of a unit 22 is for example present in integrated circuit STV 0360 manufactured by the applicant. This integrated circuit comprises a so-called "long echo protection" register. The content of the long echo protection register is used to finely adjust the setting of the FFT analysis window and is determined from quality criterion EPQ provided by unit 50, possibly after a computerized processing. For example, a microcontroller, which can be internal or external to the demodulator, can be coupled to unit 22 in order to receive quality criterion EPQ and modify the content of the long echo protection register in order to minimize the quality criterion. When the quality criterion has a low value, the window is well positioned and no adjustment is performed. When the quality criterion has a high value, an adequate repositioning of the window is performed.

The above mentioned microcontroller can also provide tests modifying the content of the long echo protection register in a periodic way or not. The microcontroller stores then the various values obtained for the quality criterion and controls the positioning of the analysis window using the control which has provided the lowest value of the quality criterion.

It should be noted that, although not detailed here, the correcting unit 30 generally comprises filters the centering of which is performed together with the positioning of the FFT analysis window. Criterion EPQ, used to position the FFT analysis window, can also be used for the possible centering of these filters.

As previously indicated, the channel response can only be known with certainty one sampling point out of three. Since the TPS carriers are at locations between the pilots, the indication provided by the TPS carriers is an indication bearing on intermediary points of the sampling sequence. Further, the redundancy and the coding of the TPS carriers make the TPS carriers particularly noise-resistant. The above remarks result in that the adjustment of the FFT analysis window by means of the TPS carriers is particularly efficient.

The applicant has performed many simulation tests by means of echoes occurring before the main signal (precursive echo) or echoes occurring after the main signal (postcursive echo). The tests have been performed with various guard interval values, among which value Tg=Tu/4, which is a source of ambiguity. In all cases, the window is rapidly and optimally positioned, and no datum is lost.

FIG. 6 illustrates an advantageous example of embodiment of TPS carrier processing unit 50. Unit 50 receives as an input the output signal of unit 30. This signal comprises the TPS carriers and the carriers conveying the data.

In unit 50, the input signal is provided to a unit 58 which extracts the TPS carriers. As mentioned in relation with FIG. 4, a received TPS carrier can be represented by a complex number TPS=x+iy. Numbers TPS are provided to an adder 60 and to a subtractor 62.

Adder 60 and subtractor 62 further each receive a sequence of numbers TPS'. Numbers TPS' are determined as follows. Any appropriate unit 65, for example, a storage element or a register, sequentially provides a number of "1s" equal to the number of carriers used in the used transmission mode (1,705 in mode 2K and 6,817 in mode 8K).

The output of unit 65 drives a unit 67. Unit 67 modifies the digital sequence which is provided thereto according to a PRBS sequence defined by above-mentioned standard ETSI. At the output of unit 67 is a reference sequence corresponding to the sequence of transmitted pilots and TPS carriers.

The output of unit 67 drives a unit 69. Unit 69 has the function of extracting, from the sequence transmitted by unit 67, numbers TPS' corresponding to the locations of the TPS carriers. Numbers TPS', of value +1 or −1, represent a theoretical sequence of numbers TPS corresponding to a faultless transmission and in the case where the first TPS carrier of the symbol corresponds to value 1.

Of course, units 65, 67, and 69 may be replaced with a single or several other appropriate units. For example, a single unit may directly provide the desired sequence of numbers TPS'. It should however be noted that the structure of FIG. 6 enables a certain symmetrization of the circuit, unit 69 corresponding to unit 58, and that this structure can easily be parameterized according to the operating mode.

Adder 60 adds complex number TPS to number TPS' for each of the TPS carriers. The output of adder 60 drives a unit 70. Unit 70 calculates the complex absolute value of sum TPS+TPS', defined by the sum of the absolute value of the real part of number TPS+TPS' and of the absolute value of the imaginary part of number TPS+TPS'. As an alternative, unit 70 may calculate the quadratic distance between numbers TPS and TPS', or calculate another distance between numbers TPS and TPS'.

Unit 70 is coupled to a unit 72 (SUM). Unit 72 calculates, for each symbol, the sum of all the values provided by unit 70. The output of unit 72 drives a dipping unit 74 intended to limit the output of unit 72 in case the maximum value is exceeded. Unit 74 provides a number a. For example, if the output of unit 50 is provided for 8-bit numbers, number a, in binary representation, is limited to eight "1s" in case this value is exceeded.

The output of subtractor 62 drives a unit 80 of same function as unit 70. In FIG. 6, unit 80 calculates the complex absolute value of the difference of numbers TPS and TPS'. Of course, if unit 70 performs another calculation, unit 80 performs the same calculation as unit 70. The output of unit 80 drives a unit 82 which calculates the sum of the absolute values provided by unit 80 for all the TPS carriers present in the symbol. The output of unit 82 drives a dipping unit 84 of same function as unit 74. Unit 84 provides a number b for each symbol.

Number b is linked to the distance of the received TPS carriers to their theoretical value, if the first TPS carrier of the symbol corresponds to a "1". Similarly, number a is linked to the distance of the received TPS carriers to their theoretical value, if the first TPS carrier of the symbol corresponds to a "−1", the sequences starting with "1" and a "−1" being inverse to each other. Indeed, sum TPS+TPS' may be interpreted as difference TPS−(−TPS'), which corresponds to the distance of the received TPS number to point (−1,0).

Of course, number a may be calculated from a sequence of numbers TPS" corresponding to the sequence, in a symbol, of the numbers corresponding to the TPS carriers when the first TPS carrier of the symbol corresponds to a "−1". This would have led to a duplication of elements 65, 67, and 69, operating from a value "−1". The fact, in FIG. 6, of using an adder 60 and a subtractor 62 from a same sequence avoids the duplication mentioned hereabove.

Numbers a and b drive a unit 90. Unit 90 analyzes numbers a and b and provides a number min(a,b) equal to that of numbers a or b which has the smallest value. Number min(a,b) is provided at the output of unit 50 on connection 52 towards unit 22.

Number min(a,b) corresponds to the distance between the received TPS carriers and the most probable transmitted TPS carriers. This number is an evaluation of the noise or of the errors affecting the received TPS carriers. This number, min(a,b), is used according to the present invention as quality criterion EPQ to modify the positioning of the FFT analysis window. If the quality criterion has a small value, this means that the received TPS carriers are dose to the transmitted carriers and that the window is well positioned. Otherwise, for example above a given threshold, the value of the quality criterion drives the window positioning to make it optimal.

Figure 7:
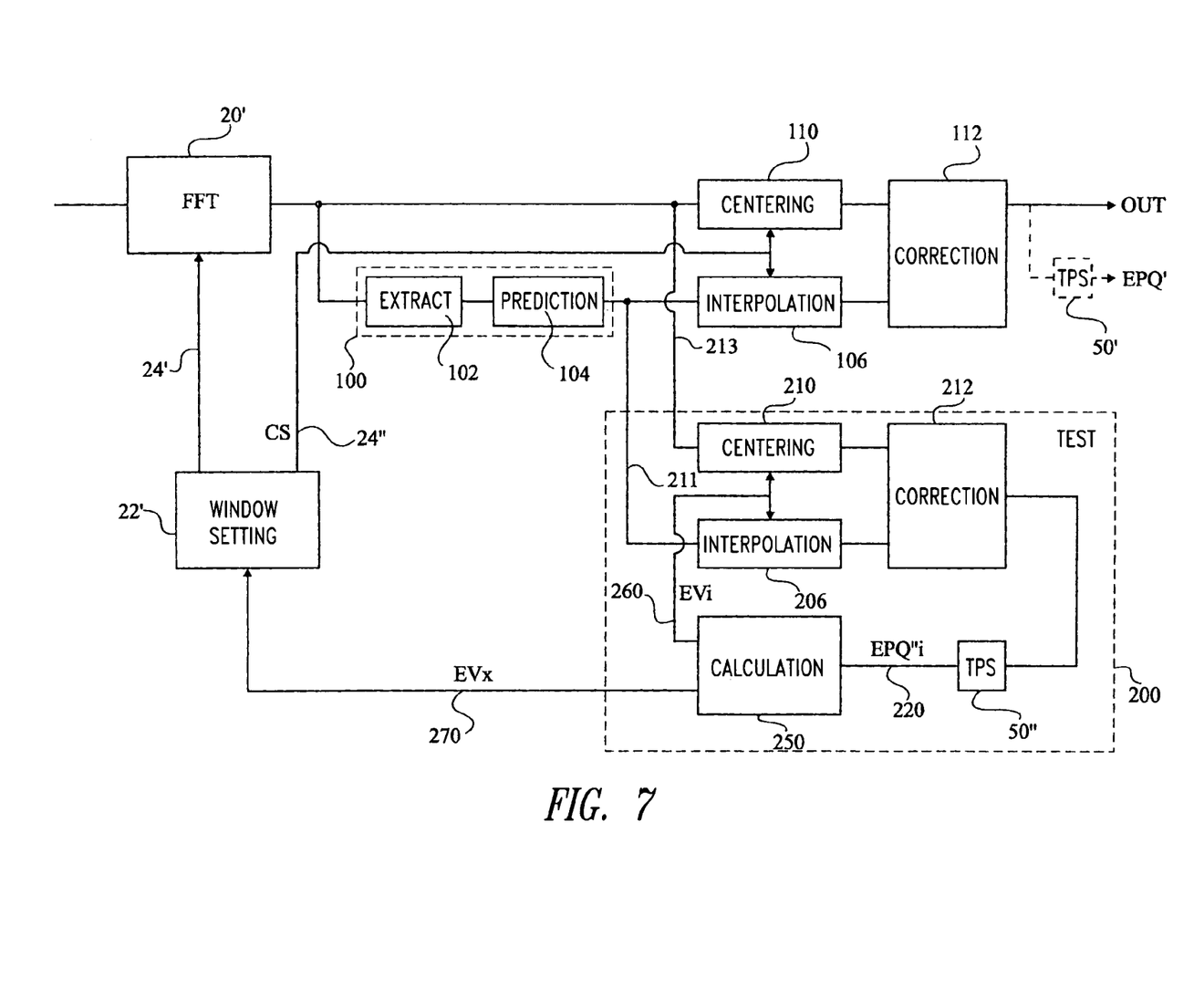
FIG. 7 shows a portion of another demodulator according to the present invention.

A new embodiment of the present invention will be now described in relation with FIG. 7, in which the elements corresponding to the elements of FIG. 5 have been designated by the same references, followed with ' or ".

FIG. 7 shows a demodulator according to the present invention, in which the fine positioning of the analysis window of the Fourier transform is performed in an automatic way at hardware level by units present in the demodulator. These units enable performing setting tests without intervening in the main processing of the data and choosing the optimal positioning of the FFT analysis window.

In FIG. 7, only the demodulator elements which are necessary to the following description have been shown. A signal to be analyzed, like the signal provided by unit 14 of FIG. 5, drives a fast Fourier transform unit (FFT) 20'.

The signal provided by unit 20' drives a channel frequency estimation unit 100. Unit 100 comprises a unit 102 intended to extract the continuous and scattered pilots contained in the signal provided by unit 20'. The output of unit 102 drives a prediction unit 104, that is an estimation unit, of the channel frequency, defined from the pilots. At the output of unit 104, there is a signal corresponding to the channel frequency estimation defined from the pilots.

The signal provided by unit 104 drives an interpolation unit 106. The interpolation unit 106 has two functions, an interpolation function using an interpolation filter and a centering function of the interpolation filter. The interpolation filter centering is controlled by a centering control signal CS present on a line 24" coming from a unit 22' that will be described later. The filtering of the signal provided by unit 104 enables providing, at the output of interpolation unit 106, a channel information estimated for all the carriers and repositioned in time.

The signal provided by unit 20' also drives a centering unit 110, which repositions this signal in time. The centering performed in unit 110 is controlled by centering control signal CS conveyed by line 24" and is performed in the same way as the centering performed in unit 106. At the output of unit 110, there is a signal which is not corrected regarding the deformations provided by the channel, but which is repositioned in time.

The output of unit 110 and the output of unit 106 drive a correction unit 112. Correction unit 112 provides, on an output OUT, a signal comprising the TPS carriers and the data carriers corrected regarding their deformations due to the frequency response of the channel. For example, unit 112 may realize the complex division between the signals provided by unit 110 and unit 106, in such a way to obtain data repositioned in time in the same way as the carriers, the channel being then completely estimated.

The signal present on output OUT may drive a processing circuit such as circuit 40 of FIG. 5, for supplying data conveyed by the data carriers.

Possibly, a unit 50', shown in dotted lines and having the same function as unit 50 of FIG. 5, may be connected at output OUT. Unit 50' can calculate the criterion quality, referenced here EPQ', and supply it at the outside of the demodulator, in particular for control or check purposes.

To help in better comparing FIG. 5 and FIG. 7, it should be noted that the function of units 102 and 104 is performed by a part of circuit 16 of FIG. 5 and that the function of unit 30 of FIG. 5 is performed by units 106, 110 and 112 of FIG. 7.

The signals respectively provided by unit 104 and unit 20' also drive a test loop 200, intended to calculate various values of quality criterion EPQ. Test loop 200 comprises an interpolation unit 206, a centering unit 210, a correction unit 212, a quality criterion determination unit 50", and a calculation unit 250.

The signal provided by unit 104 drives interpolation unit 206 via a line 211. Unit 206 has the same function as unit 106 and can be of the same constitution or not (for example, unit 206 can have a simplified constitution in relation to unit 106). Unit 206 performs an interpolation and a temporal centering of the signal present on line 211. The centering is performed by unit 206 by means of a centering control signal EVi present on a line 260. Unit 206 provides a signal corresponding to the channel response estimated for all the carriers of the signal.

Unit 210 receives the signal provided by unit 20' via a line 213. Unit 210 has the same function as unit 110 and can be of the same constitution or not. Unit 210 performs a temporal correction identical to the correction performed in unit 206. Unit 210 is controlled by the centering control signal EVi present on line 260.

The output of unit 206 and the output of unit 210 drive correction unit 212. Unit 212 has the same function, possibly the same constitution, as unit 112. At the output of unit 212, there is a signal comprising the signaling carriers TPS corrected regarding their deformations due to the frequency response of the channel and repositioned in time by means of the centering control signal supplied by line 260.

The output of unit 212 drives unit 50", which can have the same constitution as unit 50'. Unit 50" provides, using the signaling carriers present at the output of unit 212, a quality criterion EPQ"i on a line 220.

The output of unit 50" drives calculation unit 250 via line 220. Unit 250 calculates, using criterion EPQ"i, the centering control signal EVi intended to units 206 and 210. Signal EVi is provided on line 260.

Test loop 200 can be used for performing test cycles in the following way. During a test cycle, unit 250 supplies a first value of the centering control signal EV1, designated hereafter first centering value, to units 206 and 260. Units 206 and 260 provide then signals which are temporally corrected by means of the centering value EV1. Unit 50" calculates, for the centering value EV1, a first quality criterion EPQ"1. Unit 250 stores the quality criterion EPQ"1, together with the centering value EV1, and sends on line 260 a second centering value EV2. Unit 50" provides then a second quality criterion EPQ"2, stored in turn by unit 250 together with the second centering value EV2.

If a test cycle comprises n tests, n quality criteria EPQ"1, EPQ"2, . . . , EPQ"n, corresponding each to a different centering value EVi, are stored in unit 250 at the end of the test cycle. Unit 250 checks then the n stored values of the quality criterion and determines the smaller quality criterion value EPQ"x. Value EPQ"x corresponds to the minimal energy error of the (non demodulated) signaling carriers TPS. Unit 250 considers then the centering value EVx which enabled obtaining the minimal quality criterion EPQ"x. The centering value EVx, corresponding to the optimal centering performed in units 206 and 210, is supplied to unit 22' via a line 270.

Unit 22' determines, using centering value EVx, an optimal positioning parameter of the Fourier transform analysis window, which is transmitted to unit 20' via line 24'. It should be noted that the optimal positioning parameter of the window can be made acting with a given time constant, in order to avoid abrupt transitions which could cause instabilities.

Unit 22' provides also centering control signal CS to units 106 and 110 via line 24". The value of signal CS can be identical to value EVx. In such a case, line 24" can be coupled to line 270, value EVx being directly transmitted to units 106 and 110 without passing through unit 22'. The value of signal CS can also correspond to value EVx after a given delay, or correspond to an average of various successive values EVx. Of course, unit 250 can also calculate the value of signal CS, in which case line 24" is no more coupled to unit 22', but to an additional output of unit 250.

It should be noted that the positioning of the FFT analysis window and the centering of the filters included in the correction units can be realized by different signals, and be thus realized in an independent way. This enables in particular taking into account echoes located outside the guard interval. It should be further noted that, in the circuit of FIG. 5, an additional line coupling unit 22 to unit 30 could have been represented for this purpose.

After having performed a test cycle, the test loop 200 can, after some time or not, start a new test cycle in order to optimize at best the positioning of the FFT analysis window and the centering of the correction elements. During a test cycle, the test loop can try all the possible values of the centering control signal EVi. The test loop can also, during a test cycle, try only one or some centering values EVi dose to the preceding optimal value EVx.

The embodiment of FIG. 7 can have various alterations, modifications and/or improvements, in particular regarding the correction units and the test loop, remaining within the scope and spirit of the present invention.

For example, instead of one test loop 200 only providing n successive tests, there can be provided several test loops arranged in parallel, providing each a reduced number of tests. Thus, p test loops can be arranged in parallel, p being comprised between 1 and n, each loop being able to perform p/n tests.

The embodiment of FIG. 7 allows setting tests without disturbing the main processing of the data. As this has been seen, test loop 200 performs same functions as the main units 106, 110, 112. The test loop allows the prediction of the quality of the demodulation for a new filter position, determined using quality criterion EPQ, and adjusting in an optimal way the positioning of the window and the centering of the filters of units 106 and 110.

Of course, the present invention is likely to have various alterations, modifications, and improvements which will readily occur to those skilled in the art. In particular, the detail of the processing of the TPS carriers is a non-limiting example only, and it is within the abilities of those skilled in the art to modify this processing as appropriate.

Also, in the example of a demodulator of FIG. 5 and FIG. 7, all units may be modified or replaced with appropriate elements. For example, input E of the circuit may directly receive a signal centered on approximately 4.5 MHz. The analog-to-digital converter may be external to the demodulator.

Similarly, the components of the circuit of FIG. 6 and their function may be modified as appropriate by those skilled in the art. For example, quality criterion EPQ may be used only in cases of strong ambiguity, like when Tg=Tu/4. In all other cases, unit 50, respectively 50', 50" may for example be deactivated and/or the quality criterion may be set to zero. Also, unit 50, respectively 50', 50" may be directly connected at the output of Fourier transform unit 20, 20', before the correction units, and not after.

Also, the present invention has been described in the frame of COFDM demodulation. However, the invention is not limited to this frame and any demodulator or demodulation method operating on signals comprising signaling carriers is intended to be in the scope and spirit of the present invention.

The present invention has also mainly been described in the context of the digital television hertzian transmission, defined by standard ETSI EN 300 744, V1.4.1. However, the present invention is limited neither to this standard, nor to this field, and may be applied in and to any device comprising a demodulator operating on signals comprising signaling carriers, be it a television receiver or not. For example, the demodulator according to the present invention may be used in a portable phone.

Such alterations, modifications, and improvements are intended to be part of this disclosure, and are intended to be within the spirit and the scope of the present invention. Accordingly, the foregoing description is by way of example only and only as defined in the following claims and the equivalents is not intended to be limiting. The present invention is limited thereto.

What is claimed is:

1. A demodulator, comprising:

a fast Fourier transform circuit to analyze a received signal in a window corresponding to a symbol, each symbol conveying several phase- and/or amplitude-modulated carriers, some of which are signaling carriers;

a circuit to position said window, said circuit to position said window having a processing unit to process the signaling carriers and a window setting unit coupled to the processing unit, wherein the circuit to position said window is able to use non demodulated signaling carriers and wherein the processing unit is able to determine a quality criterion from the signaling carriers; and one or more first correction units coupled to the fast Fourier transform circuit and controlled using said quality criterion, wherein the circuit to position said window has at least one test circuit including one or more second correction units having a same function as said one or more first correction units, and coupled to the processing unit, itself coupled to the window setting unit and able to control the one or more second correction units.

2. The demodulator of claim 1, wherein the processing unit includes:

a unit to extract the signaling carriers from a received symbol;

a subtractor to subtract, from numbers representative of the extracted signaling carriers, numbers representative of a sequence of signaling carriers transmitted in the symbol;

a first calculation unit to provide an amplitude associated with a difference provided by said subtractor;

a first adder to provide, for each symbol, a sum of amplitudes provided by said first calculation unit;

an adder to add to the numbers representative of the extracted signaling carriers, numbers representative of a sequence of signaling carriers transmitted in the symbol;

a second calculation unit to provide an amplitude associated with a sum provided by said adder; and a second adder to provide, for each symbol, a sum of amplitudes provided by said second calculation unit.

3. The demodulator of claim 2 wherein the processing unit includes a third calculation unit coupled to the first and second adders to provide said quality criterion, said quality criterion being a number representative of a smallest sum among the sums provided by the first and second adders.

4. The demodulator of claim 3 wherein the processing unit further includes:

a first clipping unit coupled to the first adder and to the third calculation unit; and a second clipping unit coupled to the second adder and to the third calculation unit.

5. The demodulator of claim 1 wherein the processing unit includes:

a unit to provide N consecutive "1s", N corresponding to a number of carriers present in a symbol;

a unit to modify the "1s" provided by the unit to provide the "1s", to replace each "1" corresponding to a position of a signaling carrier in the symbol with a number representative of the signaling carrier, a first signaling carrier corresponding to a "1"; and a unit to extract numbers corresponding to a location of the signaling carriers in the symbol, to provide numbers representative of a sequence of signaling carriers transmitted in the symbol.

6. A demodulation method, comprising:

transforming, by fast Fourier transform analyzing, a received signal in a window corresponding to a symbol, each symbol conveying several phase- and/or amplitude-modulated carriers, some of which are signaling carriers; and positioning of said window, wherein said positioning of said window is able to use non-demodulated signaling carriers, wherein said positioning includes processing the signaling carriers by:

extracting the signaling carriers from a received symbol;

subtracting, from numbers representative of the extracted signaling carriers, numbers representative of a sequence of signaling carriers transmitted in the symbol;

first calculating a first amplitude associated with a difference provided by said subtracting;

obtaining, for each symbol, a sum of first amplitudes provided by said first calculating;

adding, to numbers representative of the extracted signaling carriers, numbers representative of a sequence of signaling carriers transmitted in the symbol;

second calculating a second amplitude associated with a sum provided by said adding; and obtaining, for each symbol, a sum of second amplitudes provided by said second calculating.

7. The method of claim 6, wherein said positioning includes elaborating a quality criterion by which the window is positioned.

8. The method of claim 7, wherein the quality criterion is elaborated based on the signaling carriers of the symbol and corresponds to a measurement of errors of received signaling carriers.

9. An apparatus, comprising:

a first circuit to analyze a received signal in a window corresponding to at least one symbol associated with the received signal, each symbol representative of several modulated carriers, including signaling carriers; and a second circuit, coupled to the first circuit, to position the window based on non-demodulated signaling carriers, wherein the second circuit includes a first unit to process the signaling carriers and a second unit coupled to the first unit to adjust a setting of the window, wherein the first unit includes:

an extraction unit to obtain the signaling carriers from a received symbol;

a subtractor coupled to the extraction unit to subtract, from numbers representative of the extracted signaling carriers, numbers representative of a sequence of signaling carriers transmitted in the symbol;

a first calculation unit coupled to the subtractor to provide an amplitude associated with a difference provided by the subtractor;

a first adder coupled to the first calculation unit to provide, for each symbol, a sum of amplitudes provided by the first calculation unit;

a second adder coupled to the extraction unit to adds, to numbers representative of the extracted signaling carriers, numbers representative of a sequence of signaling carriers transmitted in the symbol;

a second calculation unit coupled to the adder to provide an amplitude associated with a sum provided by the second adder; and a third adder coupled to the second calculation unit to provide, for each symbol, a sum of amplitudes provided by said second calculation unit.

10. The apparatus of claim 9 wherein the first circuit comprises a fast Fourier transform circuit.

11. The apparatus of claim 9 wherein the modulated carriers include at least one of phase-modulated or amplitude-modulated carriers.

12. The apparatus of claim 9 further comprising a third calculation unit coupled to the first and third adders to provide a quality criterion, the quality criterion being number representative of a smallest sum among the sums provided by the first and third adders.

13. The apparatus of claim 9, further comprising a third unit coupled to the first unit to provide the numbers representative of the sequence of signaling carriers transmitted in the symbol.

14. An apparatus, comprising:

a means for transforming, by fast Fourier transform analyzing, a received signal in a window corresponding to a symbol, each symbol conveying several phase- or amplitude-modulated carriers, including signaling carriers;

a means for positioning the window, based on non-demodulated signaling carriers, wherein said means for positioning the window includes a window setting unit and a processing means for determining a quality criterion from the signaling carriers; and one or more first correction units coupled to said means for transforming by fast fast Fourier transform analyzing and controllable using said quality criterion, wherein the means for positioning said window has at least one test circuit including one or more second correction units having a same function as said one or more first correction units, wherein said processing means is coupled to the window setting unit and is able to control the one or more second correction units.

15. The apparatus of claim 14 wherein said means for positioning includes:

means for extracting the signaling carriers from a received symbol;

means for subtracting, from numbers representative of the extracted signaling carriers, numbers representative of a sequence of signaling carriers transmitted in the symbol;

means for first calculating a first amplitude associated with a difference provided by said subtracting;

means for obtaining, for each symbol, a sum of first amplitudes provided by said first calculating;

means for adding, to numbers representative of the extracted signaling carriers, numbers representative of a sequence of signaling carriers transmitted in the symbol;

means for second calculating a second amplitude associated with a sum provided by said adding; and means for obtaining, for each symbol, a sum of second amplitudes provided by said second calculating.

16. The apparatus of claim 14 wherein said processing means includes:

means for providing N consecutive "1s", N corresponding to a number of carriers present in a symbol;

means for modifying the "1s" provided by the means for providing the "1s", for replacing each "1" corresponding to a position of a signaling carrier in the symbol with a number representative of the signaling carrier, a first signaling carrier corresponding to a "1"; and means for extracting numbers corresponding to a location of the signaling carriers in the symbol, to provide numbers representative of a sequence of signaling carriers transmitted in the symbol.

17. A demodulator, comprising:
a fast Fourier transform circuit to analyze a received signal in a window corresponding to a symbol, each symbol conveying several phase- and/or amplitude-modulated carriers, some of which are signaling carriers; and
a circuit to position said window and able to use non demodulated signaling carriers, wherein the circuit to position said window includes a processing unit to process the signaling carriers and a window setting unit coupled to the processing unit, wherein the processing unit includes:
a unit to provide N consecutive "1s", N corresponding to a number of carriers present in a symbol;
a unit to modify the "1s" provided by the unit to provide the "1s", to replace each "1" corresponding to a position of a signaling carrier in the symbol with a number representative of the signaling carrier, a first signaling carrier corresponding to a "1"; and
a unit to extract numbers corresponding to a location of the signaling carriers in the symbol, to provide numbers representative of a sequence of signaling carriers transmitted in the symbol.

18. The demodulator of claim 17 wherein the processing unit includes:
an extraction unit to obtain the signaling carriers from a received symbol;
a subtractor coupled to the extraction unit to subtract, from numbers representative of the extracted signaling carriers, numbers representative of a sequence of signaling carriers transmitted in the symbol;
a first calculation unit coupled to the subtractor to provide an amplitude associated with a difference provided by the subtractor;
a first adder coupled to the first calculation unit to provide, for each symbol, a sum of amplitudes provided by the first calculation unit;
a second adder coupled to the extraction unit to add, to numbers representative of the extracted signaling carriers, numbers representative of a sequence of signaling carriers transmitted in the symbol;
a second calculation unit coupled to the adder to provide an amplitude associated with a sum provided by the second adder; and
a third adder coupled to the second calculation unit to provide, for each symbol, a sum of amplitudes provided by said second calculation unit.

19. The demodulator of claim 18, further comprising a third calculation unit coupled to the first and third adders to provide a quality criterion, the quality criterion being number representative of a smallest sum among the sums provided by the first and third adders.

20. The demodulator of claim 19 wherein the processing unit further includes:
a first clipping unit coupled to the first adder and to the third calculation unit; and
a second clipping unit coupled to the second adder and to the third calculation unit.

* * * * *